United States Patent [19]

Bates et al.

[11] Patent Number: 4,719,610
[45] Date of Patent: Jan. 12, 1988

[54] OBJECTIVE LENS VELOCITY CONTROL SYSTEM FOR USE IN AN OPTICAL DATA STORAGE SYSTEM

[75] Inventors: Everett N. Bates, Fountain; Gregory V. Hofer, Colorado Springs, both of Colo.

[73] Assignee: Optotech, Inc., Colorado Springs, Colo.

[21] Appl. No.: 847,328

[22] Filed: Apr. 2, 1986

[51] Int. Cl.$^4$ .................... G11B 17/00; G11B 21/10
[52] U.S. Cl. ........................................ 369/32; 369/124
[58] Field of Search ................. 369/32, 124, 115, 119

[56] References Cited

U.S. PATENT DOCUMENTS

| | | | |
|---|---|---|---|
| 4,607,358 | 8/1986 | Maeda et al. | 369/32 |
| 4,615,023 | 9/1986 | Inada et al. | 369/32 |
| 4,627,038 | 12/1986 | Abed et al. | 369/32 |

Primary Examiner—Steven L. Stephan
Attorney, Agent, or Firm—Kinney & Lange

[57] ABSTRACT

An objective lens velocity control system for use in an optical data storage system. The optical data storage system includes an optical disk with servo tracks for storing data, an objective lens, and a tracking drive for driving the objective lens along the tracking axis in response to tracking drive signals. The tracking error detector is responsive to the objective lens and produces tracking error signals representative of the position of the objective lens along the tacking axis. The tracking error signal also defines measurement periods which are representative of an actual velocity of the objective lens. A velocity control is responsive to the tracking error detector and produces the tracking drive signals in a form tending to cause the objective lens to have a desired velocity. For each measurement period, the tracking control produces a first tracking drive signal during a first portion but for no longer than a time duration which is a function of the desired velocity. During the remaining second portion of the measurement period, the velocity control produces a second tracking drive signal. The first and second tracking drive signals (which have opposite effects on the velocity) together tend to cause the objective lens to decelerate during measurement periods when the actual velocity is greater than the desired velocity, and to accelerate during the measurement period when the actual velocity is less than the desired velocity.

17 Claims, 5 Drawing Figures

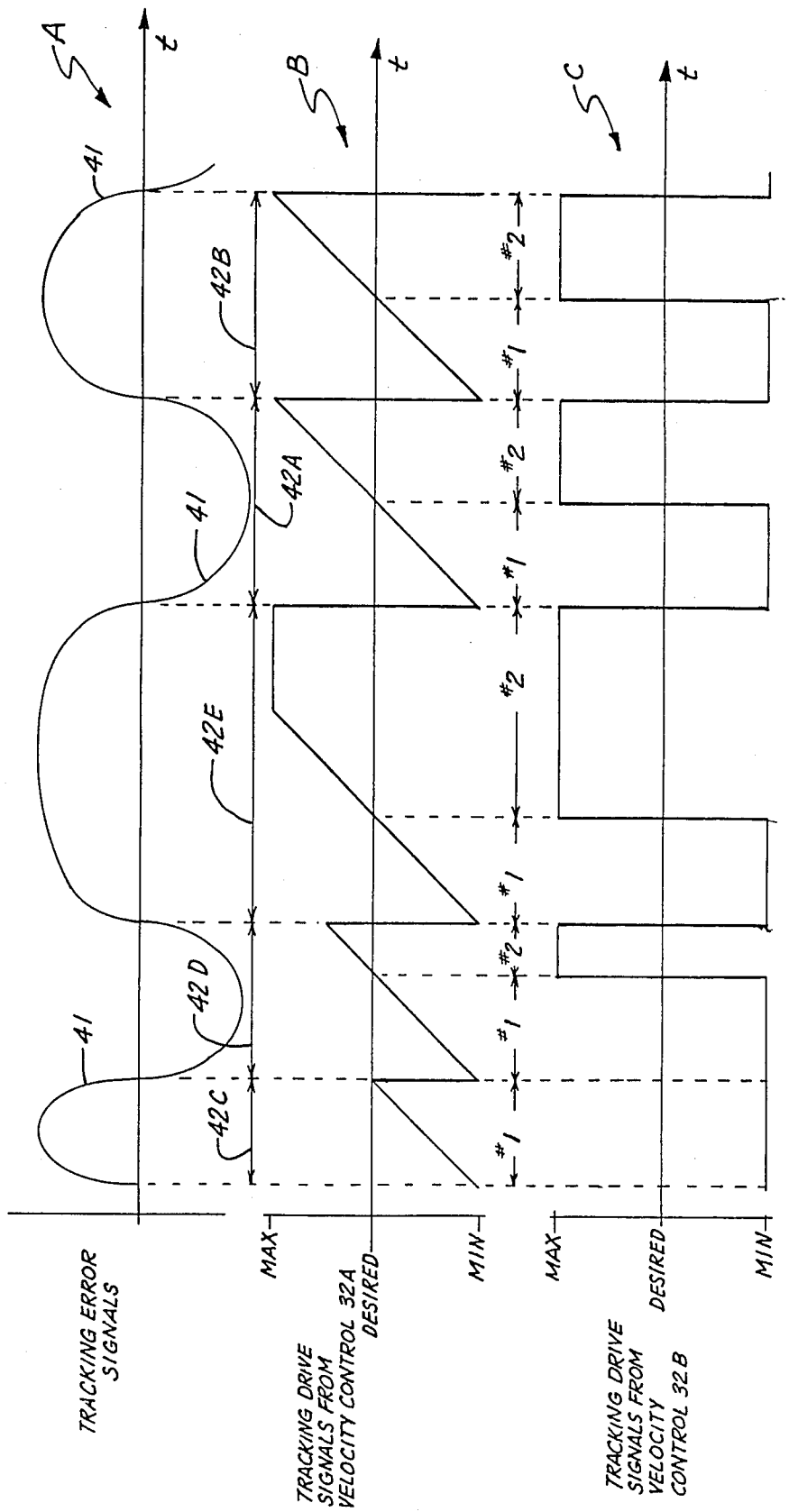

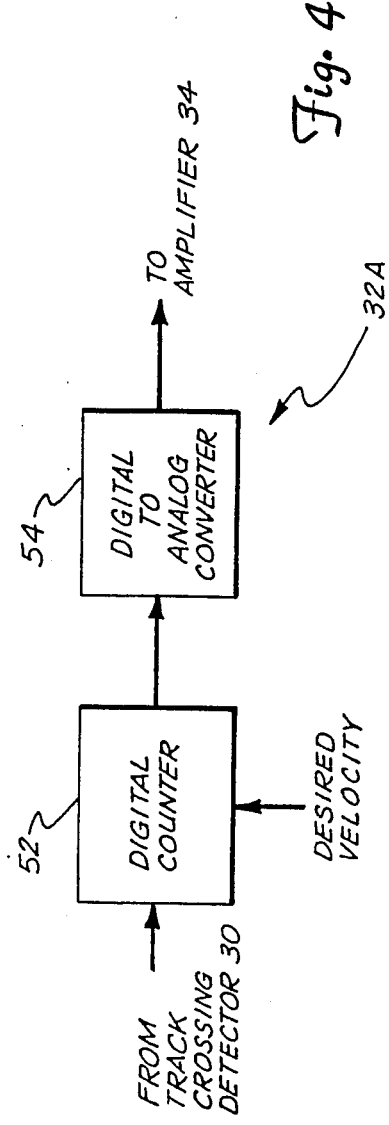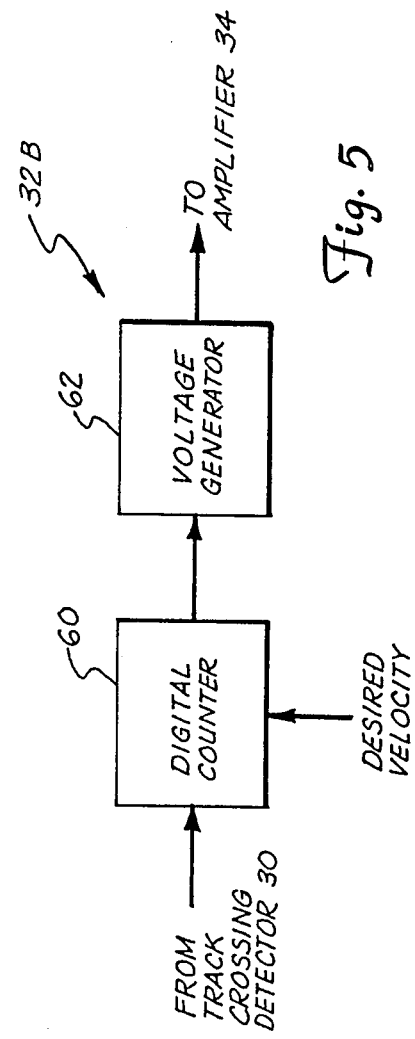

OBJECTIVE LENS VELOCITY CONTROL SYSTEM FOR USE IN AN OPTICAL DATA STORAGE SYSTEM

BACKGROUND OF THE INVENTION

1. Field of the Invention

The present invention relates to optical data storage systems. In particular, the present invention is an objective lens velocity control system for use in an optical data storage system.

2. Description of the Prior Art

Optical data recording technology has developed to the point where it is commonly found in many consumer electronic products. Optical video disks and optical compact audio disks have, for example, become very popular. This technology is also being adapted to high density optical data recording and storage systems. With continued advances in this technology, it is believed that optical systems of this type will be capable of surpassing magnetic data storage systems currently in widespread use in terms of both performance and cost.

Optical data recording systems of the types referred to above include a record carrier, or disk, on which arcuate servo tracks are positioned. A laser beam which is focused by an objective lens is used to write data onto, and to read data from, the servo tracks. A tracking drive system is used to drive the objective lens along a tracking axis, thereby moving the objective lens and laser beam to desired servo tracks on the record carrier.

Included within the tracking drive system is a velocity control system for controlling the velocity of the objective lens along the tracking axis as it is driven between servo tracks. Velocity control systems of the prior art typically implement a sequential three-phase velocity control cycle including measurement, calculation, and correction-output phases.

During the measurement phase, a tracking error signal representative of the position of the objective lens relative to individual servo tracks along the tracking axis is monitored to determine the actual velocity of the objective lens. The velocity control system then calculates the difference between the actual velocity and a desired velocity during the calculation phase. During the correction-output phase, the velocity control system produces a tracking drive signal as a function of the difference between the actual and desired velocities, and applies this tracking drive signal to a tracking actuator which drives the objective lens along the tracking axis.

The prior art velocity control system discussed above has inherent phase delays which reduce overall stability of the system and introduce errors. Even though the calculation and correction-output phases of a cycle can be performed during the measurement phase of the following cycle, there are always delays between the measurement phase and the correction-output phase due to the finite amount of time required to perform the calculation and correction-output phases. Velocity of the objective lens has likely changed between an end of a measurement phase and the beginning of a correction-output phase. As a result, the tracking drive signal is not accurately correcting for the current velocity of the lens. This phase delay results in a loss of stability and control over the objective lens. Although one technique to reduce this phase delay is to implement the velocity control system with a faster microprocessor, this adds to the overall system cost and increases its power consumption.

Clearly, there is a continuing need for improved velocity control systems for use in optical data storage systems. A velocity control system which corrects for errors in the velocity of the objective lens during measurement phases would be especially desirable. Phase delays associated with the calculation and correction-output phases can thereby be eliminated. Stability and control of the velocity control system would thereby be enhanced. Of course, the velocity control system must also be relatively inexpensive and cost effective.

SUMMARY OF THE INVENTION

The present invention is an objective lens velocity control apparatus for use in an optical data storage system. The velocity control apparatus corrects errors in the objective lens velocity during measurement cycles, thereby eliminating phase delays associated with the calculation and correction-output phases of prior art velocity control apparatus. Stability and control of the objective lens are thereby enhanced. The velocity control apparatus of the present invention is cost effective as it is easily implemented with inexpensive microprocessors.

Velocity control apparatus in accordance with the present invention includes an optical disk with servo tracks, and an objective lens. Tracking drive means drive the objective lens along a tracking axis in response to tracking drive signals. Tracking error detector means produce tracking error signals representative of relative movement of the objective lens along the tracking axis. The tracking error signals also define measurement periods which are representative of an actual velocity of the objective lens. Velocity control means are responsive to the tracking error detector means, and produce the tracking drive signals in a form tending to cause the objective lens to have a desired velocity. The velocity control means produces a first tracking drive signal for a first portion of each measurement period, but for no longer than a time duration which is a function of the desired velocity. A second tracking drive signal is produced by the velocity control means for any remaining second portion of the measurement periods. The combined effect of the first and second tracking drive signals tends to cause the objective lens to decelerate during the measurement periods when the actual velocity of the objective lens is greater than the desired velocity, and to accelerate during the measurement period when the actual velocity is less than the desired velocity.

BRIEF DESCRIPTION OF THE DRAWINGS

FIG. 3 is a graphic representation of tracking drive signals produced as a function of tracking error signals by a velocity control in accordance with the present invention.

FIG. 4 is a block diagram representation of one embodiment of the velocity control of the present invention for producing the tracking drive signals illustrated at B in FIG. 3.

FIG. 5 is a block diagram representation of a second embodiment of the velocity control of the present invention for producing the tracking drive signals illustrated at C in FIG. 3.

DETAILED DESCRIPTION OF PREFERRED EMBODIMENTS

Figure 1:
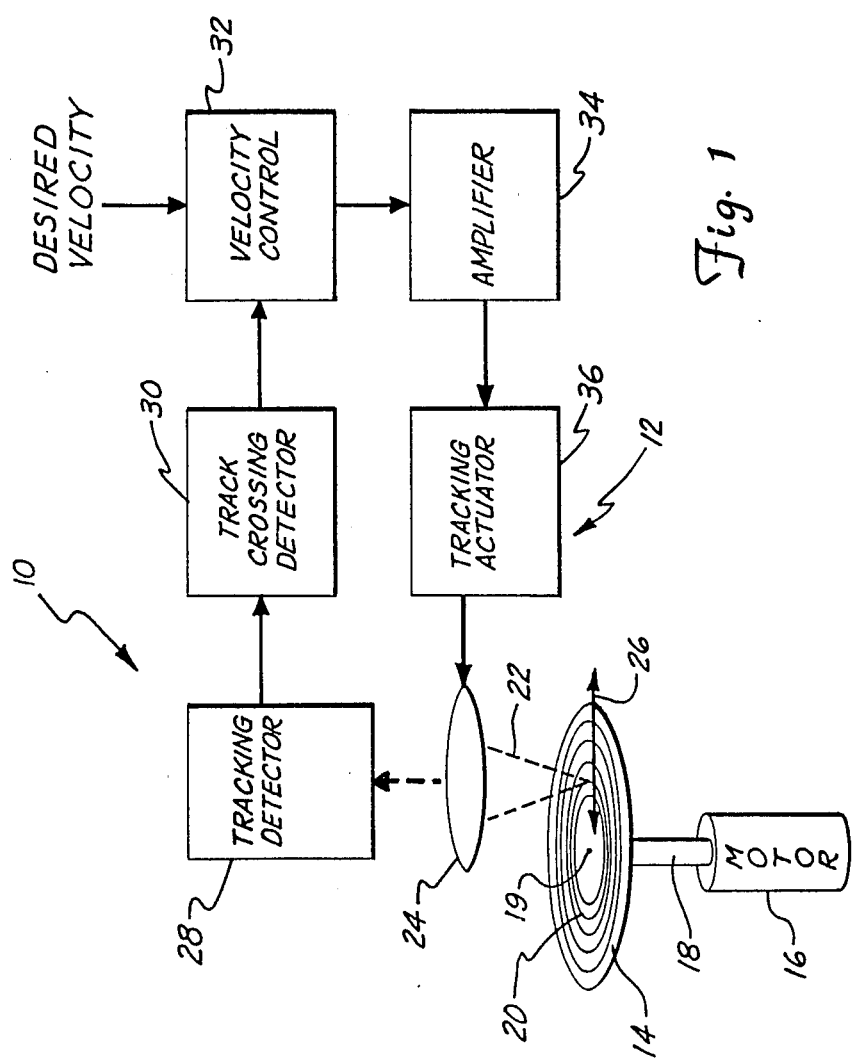
FIG. 1 is a block diagram representation of an optical data storage system with a velocity control system in which the velocity control system of the present invention can be implemented.

An optical data storage system 10 which includes an objective lens velocity control system 12 is illustrated generally in FIG. 1. Optical data storage system 10 includes a record carrier 14 which is mounted on spindle 18 and rotated about a rotational axis 19 by motor 16. Information is optically encoded onto arcuate servo tracks 20 which are positioned on a recording surface of record carrier 14. Information is written to and read from servo tracks 20 by means of a radiation beam 22 which is produced by a laser (not shown), and focused onto record carrier 14 by objective lens 24.

Objective lens velocity control system 12 controls the velocity of motion of objective lens 24 along a tracking axis 26 which is typically radially oriented with respect to rotational axis 19 of record carrier 14. As shown, velocity control system 12 includes an optical detector such as tracking detector 28, track crossing detector 30, velocity control 32, amplifier 34, and tracking actuator 36. Modulated radiation collected from servo tracks 20 by objective lens 24 is impinged upon tracking detector 28. In response to the collected radiation, tracking detector 28 produces a tracking error signal representative of a position of objective lens 24 along tracking axis 26 relative to individual servo tracks 20. The tracking error signal is applied to track crossing detector 30 which produces a track crossing signal each time objective lens 24 crosses a center of a servo track 20 or a center of a land portion 40.

As shown in FIG. 1, velocity control 32 is connected to receive the track crossing signals and a desired velocity signal representative of a desired velocity of objective lens 24 along tracking axis 26. Velocity control 32 produces a tracking drive signal as a function of the track crossing signals and the desired velocity signal. The tracking drive signal is then processed by amplifier 34, and applied to tracking actuator 36. Tracking actuator 36 drives objective lens 24 along tracking axis 26 in response to the processed tracking drive signal.

In one preferred embodiment, lens 24, tracking detector 28, and tracking actuator 36 are components of a commercially available optical head assembly such as Models TAOHS-LC3 and TAOHS-LC4 manufactured by the Olympus Optical Co., Ltd. In this embodiment, tracking actuator 36 is responsive to a current tracking drive signal while the tracking drive signal produced by velocity control 32 is a voltage signal. Amplifier 24 converts the voltage tracking drive signal received from velocity control 32 to a current tracking drive signal which can be applied to tracking actuator 36. Velocity control system 12 as described above characterizes the operation of prior art velocity control systems as well as that of the present invention. As will be understood from subsequent portions of this specification, the velocity control system of the present invention is distinguished from those of the prior art by the functions performed by velocity control 32.

Figure 2:
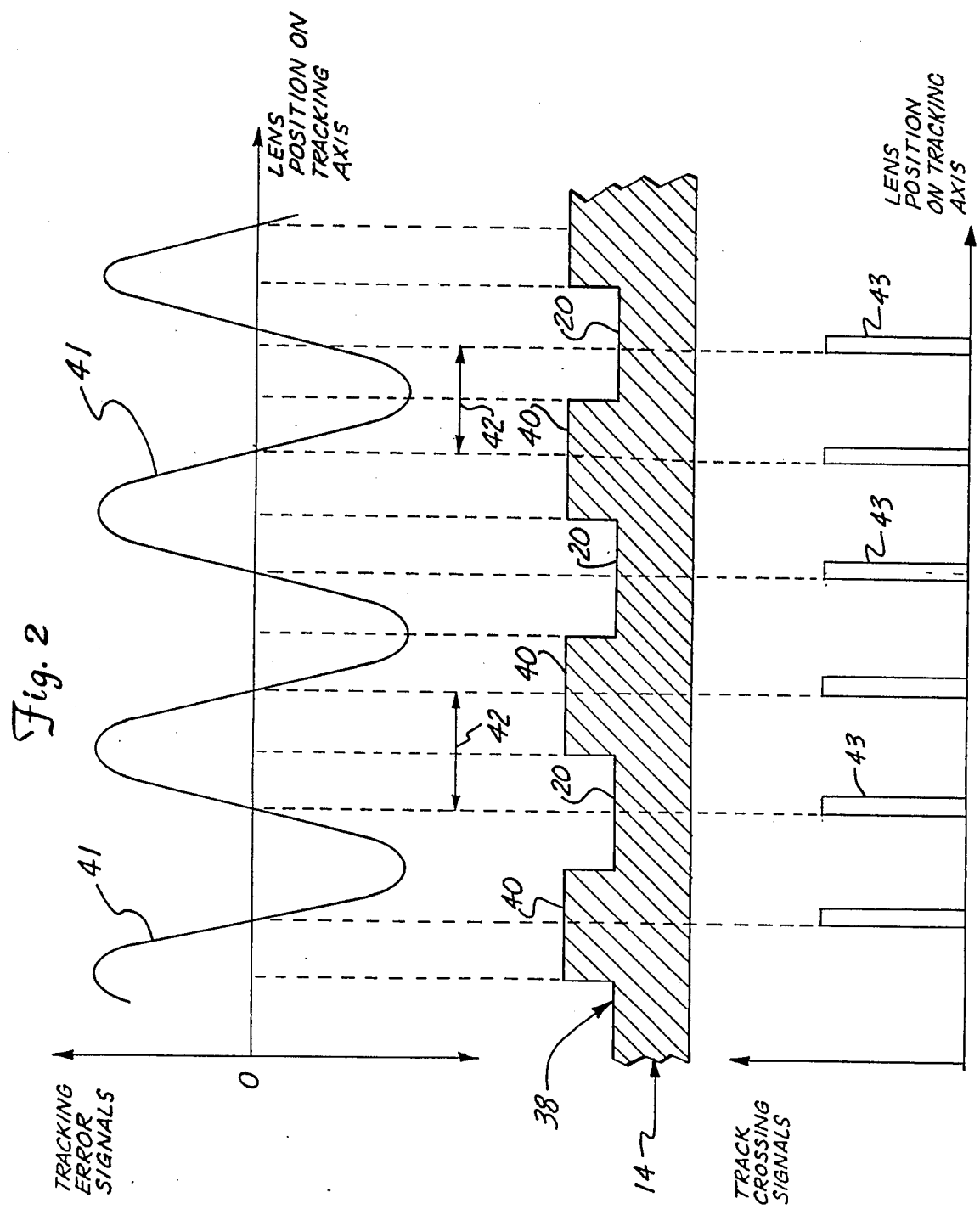
FIG. 2 is a graphic representation of outputs of a tracking detector and a track crossing detector as a function of objective lens position along a tracking axis.

Optical record carrier 14, tracking error signals produced by tracking detector 28, and track crossing signals produced by track crossing detector 30, are illustrated in greater detail in FIG. 2. Record carrier 14 is commercially available in several different forms from a number of different manufacturers. Record carrier 14 will typically have a radiation sensitive recording surface 38 on which servo tracks 20 are formed as grooves. Each servo track 20 is radially separated from adjacent servo tracks 20 by a land portion 40. In the embodiment shown, servo tracks 20 have a width which is approximately equal to a width of land portions 40, which can be on the order of 0.8 um.

Tracking error detector 28 produces tracking error signals 41 representative of the direction and distance of objective lens 24, and therefore radiation beam 22, from individual servo tracks 20. Tracking error signals 41 produced by a commonly used quadrature-type tracking detector 28 are illustrated in FIG. 2. As shown, tracking error signals 41 resemble a sine wave and have a magnitude of zero when radiation beam 22 is centered over servo tracks 20 or land portions 40. Zero crossings of tracking error signals 41 are, therefore, representative of a center of a servo track 20 or a land portion 40. Positive and negative peaks of tracking error signals 41 occur at transitions between land portions 40 and servo tracks 20.

As shown in FIG. 2, track crossing detector 30 preferably produces track crossing signals 43 in the form of pulses at each zero crossing of tracking error signals 41, (i.e., when objective lens 24 is centered over a servo track 20 or land portion 40). When used as a time base, frequency, and therefore periods 42, of each half-cycle of tracking error signals 41 are representative of a velocity of objective lens 24 along tracking axis 26. Similarly, frequency and periods 42 of track crossing signals 43 are representative of a velocity of objective lens 24.

Tracking error signals 41 produced by tracking detector 28 when objective lens 24 has a changing velocity are illustrated at A in FIG. 3. When objective lens 24 has a desired velocity, tracking error signals 41 will have a period 42 of a predetermined length, hereinafter referred to as a predetermined period. Periods 42A and 42B of the tracking error signals 41 shown in FIG. 3 are representative of the predetermined period. Periods 42C and 42D of tracking error signals 41 are shorter than desired periods 42A and 42B, and are produced when objective lens 24 has a velocity greater than the desired velocity. Period 42E of tracking error signal 41, on the other hand, is greater than desired periods 42A and 42B, thereby indicating that objective lens 24 has an actual velocity less than the desired velocity.

Unlike prior art velocity control systems, the velocity control system of the present invention does not utilize a technique involving separate measurement, calculation, and correction-output phases. Rather, the velocity control system of the present invention incorporates the correction-output phases within each measurement phase. In essence, the calculation phase is completely eliminated. As a result, phase delay is significantly reduced, thereby increasing the stability of the velocity control system 12. The improved features of the velocity control system of the present invention are implemented by velocity control 32.

An understanding of the operation of the velocity control 32 in accordance with the present invention will be facilitated by a brief outline of the principles upon which they are based. Rather than producing a tracking drive signal as a function of a difference between the desired velocity and the actual velocity of objective lens 24 as measured during a measurement period, velocity control 32 produces tracking drive signals which cause tracking actuator 36 to exert forces on objective lens 24 "tending" to cause the velocity of objective lens 24 to vary or change during the measurement periods. The words "tends" or "tending" are used in this description because objective lens 24 does not respond immediately to tracking drive signals produced by velocity control 32.

Measurement periods are defined as any desired period of time during which information representative of, or characterizing, the actual velocity of objective lens 24 can be derived from tracking error signals 41 or track crossing signals 43. For purposes of illustration, the term "measurement periods" as used throughout the remainder of this specification will refer to half cycle periods 42A-42E of tracking error signals 41. Measurement periods 42A-42E are established or characterized by track signals 43. It will be understood by those skilled in the art that full-cycles or even quarter-cycles of the tracking error signals 41 could also be used for the measurement periods.

Velocity control 32 of the present invention produces tracking drive signals which tend to cause the velocity of objective lens 24 to vary during measurement periods 42A-42E. Velocity control 32 will produce tracking drive signals having a first portion which tends to cause objective lens 24 to have a velocity less than the desired actual velocity for up to a first portion of each measurement period 42A-42E. The first portion will have a time duration which is the shorter of measurement periods 42A-42E, or a duration which is a function of the desired velocity. The first portion of the tracking drive signal is therefore produced for no longer than a time duration which is a function of the desired velocity. For any remaining second portion of measurement periods 42A-42E, velocity control 32 will produce tracking drive signals having a second portion which tends to cause objective lens 24 to have a velocity greater than the desired velocity.

These tracking drive signals described above are produced by velocity control 32 in such a manner that they will tend to cause objective lens 24 to have an average velocity during measurement periods 42A-42E which is equal the desired velocity only when objective lens 24 has the desired velocity. When an average velocity of objective lens 24 is greater than the desired velocity (such as during measurement periods 42C and 42D,) the tracking drive signals will force objective lens 24 to slow down or decelerate during the measurement periods 42C and 42D, and lower its actual velocity. When the average velocity of objective lens 24 is less than the desired average velocity (such as during measurement period 42E), velocity control 32 produces tracking drive signals which force objective lens 24 to accelerate or speed up during measurement period 42E. These control operations are performed during the measurement period, and do not require calculation of the actual velocity.

A first preferred embodiment, velocity control 32A, for implementing the above described velocity control system 12 is shown in FIG. 4. As shown, velocity control 32A includes digital counter 52 and digital-to-analog converter (DAC) 54. Tracking drive signals produced by velocity control 32A shown in FIG. 4, and their relationship to tracking error signals 41, are illustrated at B in FIG. 3. Velocity control 32A produces ramping tracking drive signals which increase from a predetermined minimum (MIN) valve to a predetermined maximum (MAX) value. The MIN value is a value less than a DESIRED value, while the MAX value is greater than the DESIRED value. The DESIRED value represents that value of tracking drive signal which, if applied to tracking actuator 36, would tend to cause objective lens 24 to have the desired actual velocity.

Digital counter 52 is connected to receive track crossing signals 43 from track crossing detector 30, and a signal representative of the desired velocity. Upon the receipt of each track crossing signal 43 indicating the beginning of a measurement period 42A-42E, digital counter 52 is reset and begins counting, thereby producing a digital counter signal which begins at a first predetermined value representative of the MIN value of the tracking drive signal. Digital counter 52 then continues to count toward a second greater predetermined value representative of the MAX value of the tracking drive signal. A rate which digital counter 52 counts is determined by or representative of the desired velocity. To this end, the desired velocity signal can be a clock signal having a frequency representative of the desired velocity. When the next track crossing signal 43 is received, indicating the end of measurement period 42A-42E, digital counter repeats these operations. The digital counter repeats these operations. The DAC 54, and applied to amplifier 34.

During the first portion #1 of each measurement period 42A-42E, velocity control 32A causes the tracking drive signals to have a value less than the DESIRED value, and thereby tends to cause objective lens 24 to have actual velocities less than the desired velocity. For any remaining or second portion #2 of measurement periods 42A-42E, velocity control 32 causes the tracking drive signal to have a value greater than the DESIRED value, and thereby tends to cause objective lens 24 to have a velocity greater than the desired velocity. As illustrated during desired measurement periods 42A and 42B, velocity control 32 causes the tracking drive signal to ramp or increase from its MIN value at such a rate that it will reach its MAX value at the end of predetermined measurement periods 42A and 42B. In the embodiment shown, the difference between the MIN value and the DESIRED value, and the difference between the MAX value and the DESIRED value, are equal. The tracking drive signal is thereby symmetrical during desired measurement periods 42A and 42B, with first portion #1 and second portion #2 having a duration of half of measurement periods 42A and 42B. As a result, the tracking drive signals will tend to cause objective lens 24 to have an average velocity over desired periods 42A and 42B equal to the desired velocity.

During measurement periods 42C and 42D, the tracking drive signals never reach their MAX value since the actual velocity of objective lens 24 during these measurement periods is greater than the desired velocity. As a result, objective lens 24 is driven by tracking drive signals having average values over measurement periods 42C and 42D which are predominantly less than that required to cause objective lens 24 to have the desired velocity. The tracking drive signals produced during measurement periods 42C and 42D will tend to decelerate objective lens 24 toward the desired actual velocity.

When objective lens 24 has a velocity less than the desired velocity such as during measurement period 42E, the tracking drive signal will reach its MAX value before the end of the measurement period. Objective lens 24 is then driven for a remainder of second portion

2 of the measurement period 42E by a tracking drive signal tending to cause objective lens 24 to have a velocity greater than the desired velocity. The tracking drive signal therefore has an average value during measurement period 42E which is predominantly greater than that which would cause objective lens 24 to have the desired velocity. Objective lens 24 is thereby accelerated toward its desired average velocity. As illustrated at B in FIG. 3, velocity control 32A produces tracking drive signals which remain at the MAX value until the end of measurement period 42E. Alternatively, the tracking drive signal can continue to increase beyond its MAX value until the end of measurement period 42E.

A second preferred embodiment, velocity control 32B, for implementing velocity control system 12 in accordance with the present invention is shown in FIG. 5. This embodiment of velocity control 32 includes digital counter 60 and voltage generator 62. Tracking drive signals produced by velocity control 32B and their relationship to tracking error signals 41, are illustrated at C in FIG. 3. As shown, velocity control 32B produces pulse width modulated tracking drive signals. Digital counter 60 is connected to receive track crossing signals 43, and a signal representative of the desired velocity.

Upon receipt of a track crossing signal 43, digital counter 60 produces an output signal which has a first digital state and which causes voltage generator 62 to produce a tracking drive signal having a MIN value. The MIN value is a value which will tend to cause objective lens 24 to have a velocity less than the desired velocity. Digital counter 60 causes its output signal to have the first digital state during the first portion #1, but for no longer than a time duration which is determined as a function of the desired velocity. The maximum length of first portion #1 is determined as a function of the desired velocity input to counter 60 (which can, for example, be a clock signal having a frequency representative of the desired velocity).

After the first portion #1, digital counter 60 produces an output signal having a second digital state which causes voltage generator 62 to produce an output signal having a MAX value. The output signal produced by digital counter 60 remains at the second digital state for any remaining second portion #2 of measurement period 42A–42E. As illustrated at C in FIG. 3, voltage generator 62 preferably causes the difference between the MIN and MAX values and the DESIRED value to be equal. In this manner, the first portion #1 and second portion #2 will be equal to one another when tracking error signals 41 have desired measurement periods 42A and 42B. First portion #1 will be a duration no longer than half of desired measurement periods 42A and 42B in this embodiment.

When objective lens 24 has a velocity greater than the desired velocity, as illustrated by measurement periods 42C and 42D, the tracking drive signals produced by velocity control 32B will have the MIN value for first portion #1 which is greater or longer than the second portion #2 that they have the MAX value. The average value of the tracking drive signal during measurement periods 42C and 42D is therefore less than the DESIRED value, and decelerates objective lens 24. When objective lens 24 has a velocity less than the desired velocity as illustrated by measurement period 42E, the tracking drive signal will have the MAX value for a second portion #2 which is greater than the first portion #1. Objective lens 24 will thereby be accelerated toward its desired velocity.

Although velocity controls 32A and 32B are described with reference to circuit elements in FIGS. 4 and 5, respectively, the functions performed by these circuit elements can easily be implemented with a simple and inexpensive programmed microprocessor. When implemented with velocity controls 32A or 32B in accordance with the present invention, velocity control system 12 eliminates phase delays present in prior art velocity control systems, thereby enhancing stability and control over objective lens 24.

Although the present invention has been described with reference to preferred embodiments, those skilled in the art will recognize that changes may be made in form and detail without departing from the spirit and scope of the invention.

What is claimed is:

1. Objective lens velocity control apparatus for use in an optical data storage system, including:
    an optical record carrier with servo tracks for storing data;
    an objective lens;
    tracking drive means for driving the objective lens along a tracking axis;
    tracking detector means for producing tracking signals representative of relative movement of the objective lens along the tracking axis with respect to the servo tracks, wherein characteristics of the tracking signals define measurement periods representative of an actual velocity of the relative movement of the objective lens along the tracking axis;
    velocity control means for producing a first tracking drive signal during a first portion of each measurement period but for no longer than a time duration which is a function of a desired velocity, and producing a second tracking drive signal for any remaining second portion of each measurement period; and
    wherein one of the first and second tracking drive signals tends to cause the objective lens to have a velocity less than the desired velocity and the other tends to cause the objective lens to have a velocity greater than the desired velocity, so that the first and second tracking drive signals together tend to cause the objective lens to decelerate during the measurement period when the actual velocity is greater than the desired velocity, and to accelerate during the measurement period when the actual velocity is less than the desired velocity.

2. The velocity control apparatus of claim 1 wherein the velocity control means produces the first tracking drive signal in a form tending to cause the objective lens to have a velocity less than the desired velocity, and produces the second tracking drive signal in a form tending to cause the objective lens to have a velocity greater than the desired velocity.

3. The velocity control apparatus of claim 2 wherein the velocity control means produces the first tracking drive signal with a time varying signal level which initially represents a first velocity less than the desired velocity and changes with time toward the desired velocity, and produces the second tracking drive signal with a time varying signal level which initially represents the desired velocity and changes with time toward a second velocity greater than the desired velocity.

4. The velocity control apparatus of claim 3 wherein the velocity control means produces the first and second tracking drive signals so that their signal levels change with time at a predetermined rate.

5. The velocity control apparatus of claim 4 wherein the velocity control means produces the first and second tracking drive signals in a form tending to cause a difference between the desired velocity, and the first and second velocities, to be equal.

6. The velocity control apparatus of claim 5 wherein the velocity control means produces the first tracking drive signal for a time duration which is equal to half of a measurement period when the objective lens has the desired velocity.

7. The velocity control apparatus of claim 2 wherein the velocity control means produces the first tracking drive signal in a form tending to cause the objective lens to have a first constant velocity less than the desired velocity during the first portion of each measurement period, and produces the second tracking drive signal in a form tending to cause the objective lens to have a second constant velocity greater than the desired velocity during the remaining second portion of each measurement period.

8. The velocity control apparatus of claim 7 wherein the velocity control means produces the first and second tracking drive signals in a form tending to cause a difference between the desired velocity, and the first and second velocities, to be equal.

9. The velocity control apparatus of claim 8 wherein the velocity control means produces the first tracking drive signal for a time duration which is equal to half of a measurement period when the objective lens has the desired velocity.

10. A method for controlling velocity of an objective lens along a tracking axis of an optical data storage system of the type including an optical disk having servo tracks for storing data, and a tracking detector which produces tracking signals representative of relative movement of the objective lens along the tracking axis with respect to the servo tracks on the optical disk and having characteristics defining measurement periods representative of an actual velocity of the relative movement, including:
driving the objective lens for a first portion of each measurement period but for no longer than a time duration which is a function of a desired velocity with a force tending to cause the objective lens to have a velocity less than the desired velocity; and
driving the objective lens for any remaining second portion of each measurement period with a force tending to cause the objective lens to have a velocity greater greater than the desired velocity, wherein a sum of the first and second forces tend to cause the objective lens to decelerate during the measurement period when the actual velocity is greater than the desired velocity, and to accelerate during the measurement period when the actual velocity is less than the desired velocity.

11. The method of claim 10 wherein:
driving the objective lens during the first portion of each measurement period includes driving the objective lens with a force tending to cause the objective lens to have a velocity which increases from a first velocity less than the desired velocity to the desired velocity; and
driving the objective lens during any remaining second portion of each measurement period includes driving the objective lens with a force tending to cause the objective lens to have a velocity which increases from the desired velocity to a second velocity greater than the desired velocity.

12. The method of claim 11 wherein:
driving the objective lens during the first portion of each measurement period includes driving the objective lens with a force tending to cause the velocity of the objective lens to increase at a constant rate from the first velocity to the desired velocity; and
driving the objective lens for any remaining second portion of each measurement period includes driving the objective lens with a force tending to cause the velocity of the objective lens to increase at a constant rate from the desired velocity to the second velocity.

13. The method of claim 12 wherein driving the objective lens during the first and any remaining second portion of the measurement period includes driving the objective lens with a force tending to cause a difference between the desired velocity and the first and second velocities to be equal.

14. The method of claim 13 wherein driving the objective lens during the first time period includes driving the objective lens with a force for a time duration which is equal to half of a measurement period when the objective lens has the desired velocity.

15. The method of claim 10 wherein:
driving the objective lens during the first portion of each measurement period includes driving the objective lens with a force tending to cause the objective lens to have a first constant velocity less than the desired velocity; and
driving the objective lens during any remaining second portion of each measurement period includes driving the objective lens with a force tending to cause the objective lens to have a second constant velocity greater than the desired velocity during the remaining second portion of each measurement period.

16. The method of claim 15 wherein driving the objective lens during the first and any remaining second portion of the measurement period includes driving the objective lens with forces tending to cause a difference between the desired velocity and the first and second velocities to be equal.

17. The method of claim 15 wherein driving the objective lens during the first portion of the measurement period includes driving the objective lens with a force for a time duration which is equal to half a measurement period when the objective lens has the desired velocity.

* * * * *